(12) United States Patent
Guillemot et al.

(10) Patent No.: US 9,244,948 B2
(45) Date of Patent: Jan. 26, 2016

(54) COMPUTER TOOL WITH SPARSE REPRESENTATION

(75) Inventors: Christine Guillemot, Chanteple (FR); Joaquin Zepeda, Rennes (FR); Ewa Kijak, Saint Aubin du Cormier (FR)

(73) Assignees: INRIA INSTITUT NATIONAL DE RECHERCHE EN INFORMATIQUE ET EN AUTOMATIQUE, Le Chesnay (FR); CENTRE NATIONAL DE LA RECHERCHE SCIENTIFIQUE (C.N.R.S), Paris (FR)

( * ) Notice: Subject to any disclaimer, the term of this patent is extended or adjusted under 35 U.S.C. 154(b) by 483 days.

(21) Appl. No.: 13/643,248

(22) PCT Filed: Apr. 26, 2011

(86) PCT No.: PCT/FR2011/050947
§ 371 (c)(1),
(2), (4) Date: Dec. 10, 2012

(87) PCT Pub. No.: WO2011/135248
PCT Pub. Date: Nov. 3, 2011

(65) Prior Publication Data
US 2013/0080431 A1    Mar. 28, 2013

(30) Foreign Application Priority Data

Apr. 26, 2010 (FR) .................................. 10 01771

(51) Int. Cl.
*G06F 17/30* (2006.01)
*G06K 9/62* (2006.01)

(52) U.S. Cl.
CPC ........ *G06F 17/30286* (2013.01); *G06K 9/6232* (2013.01)

(58) Field of Classification Search
CPC .................................................. G06F 17/30985
USPC .......................................... 707/802, 999.101
See application file for complete search history.

(56) References Cited

U.S. PATENT DOCUMENTS

| | | | | |
|---|---|---|---|---|
| 7,149,320 | B2* | 12/2006 | Haykin et al. | 381/320 |
| 8,311,334 | B2* | 11/2012 | Guleryuz et al. | 382/181 |
| 8,760,572 | B2* | 6/2014 | Bilgin et al. | 348/424.1 |
| 2005/0069162 | A1* | 3/2005 | Haykin et al. | 381/312 |
| 2011/0116724 | A1* | 5/2011 | Bilgin et al. | 382/248 |
| 2014/0037199 | A1* | 2/2014 | Aharon et al. | 382/159 |

OTHER PUBLICATIONS

Chinh La et al: "Tree-Based Orthogonal Matching Pursuit Algorithm for Signal Reconstruction", Image Processing, 2006 IEEE International Conference on. IEEE. PI, Oct. 1, 2006.

(Continued)

*Primary Examiner* — Baoquoc To

(57) ABSTRACT

A computer tool is presented. The computer tool has, for example, a working memory to receive input data, an auxiliary memory to store several approximation dictionaries, a reducer arranged for the iterative calculation of the approximation data of the input data. The successive iterations are of the "matching pursuit" type. The computer tool also has, for example, a selector arranged to choose an approximation dictionary in the auxiliary memory based on a selection ruled based on at least some of the preceding iterations, in which the reducer calls the selector in each iteration, and uses the dictionary thus selected in the adaptive matching.

9 Claims, 5 Drawing Sheets

(56) References Cited

OTHER PUBLICATIONS

Daudet L.: 11 Sparse and structured decomposition of signals with the molecular matching pursuit IEEE Trans. on Audio Speech and Language Processing, vol. 14. No. 5. Sep. 2006, pp. 1808-1816.

Mailhe B .et al.: "Local orthogonal greedy pursuits for scalable sparse approximations of large signals with shift invariant dictionaires", SPARS'09 Conference on Signal Processing With Adaptive Sparse Structures Representations 2009.

Philippe Jost et al: "Tree-Based Pursuit: Algorithm and Properties", IEEE Transactions on Signal Processing. IEEE Service Center. New York. NY, US,vol. 54, No. 12, Dec. 1, 2006,pp. 4685-4697.

Karabulut G Z et al: "Integrating flexible tree searches to orthogonal matching pursuit algorithm", IEEE Proceedings: Vision, Image and Signal Processing. Institution of Electrical Engineers, GB, vol. 153. No. 5, Oct. 12, 2006,pp. 538-548.

Rahmoune A et al: 11 The M-Term Pursuit for Image Representation and Progressive Compression, Image Processing, 2005, ICIP 2005, vol. 1. Sep. 11, 2005, pp. 73-76.

Cotters Fetal: 11 Application of tree-based searches to matching pursuit, 2001 IEEE International Conference on Acoustics, Speech and Signal Processing Proceedings. (ICASSP). Salt Lake City, UT, May 7-11, 2001; [IEEE International Conference on Acoustics Speech and Signal Processing (ICASSP)]. New York. NY; IEEE. US. vol. 6, May 7, 2001 pp. 3933-3936.

Nishtura, Hidenari, et al., "A shift-invariant non-negative sparse coding with tree-structured dictionary", International Meeting of Psychometric Society, pp. 19-20, Oct. 29, 2008, (English translation of Abstract only).

\* cited by examiner

ID="1"/>

COMPUTER TOOL WITH SPARSE REPRESENTATION

The invention concerns the field of sparse representation of a signal by means of a computer.

BACKGROUND

Representations are based on a set of known data, referred to as a dictionary. Sparse representation is achieved by selecting the items from the dictionary that are closest to the content to be compressed, and only transmitting information related to these items.

Generally, an algorithm of the "matching pursuit" family, ("MP algorithm") is implemented in order to determine the sparse representation based on the content to be compressed and the dictionary.

Computer tools implementing this type of scheme are very powerful, as the degree of compaction of the approximation obtained is high, and the matching pursuit algorithms are highly effective. However, it is difficult to obtain a dictionary that performs on data of these varied types, as this necessitates a large dictionary, which entails increased storage and calculation costs.

Various methods have been developed in order to compensate this disadvantage. One of these methods is the "K-SVD" method. According to this method, a dictionary is optimised based on the number of iterations intended.

Although this is satisfactory to a certain extent, this method generally remains insufficient. In fact, it provides a dictionary that is optimised on average, but not necessarily for each of the iterations of the MP algorithm. Furthermore, this dictionary is fixed for all iterations, and thus unsuitable if one decides to change the number of iterations.

SUMMARY OF THE INVENTION

It is an object of the present invention to improve this situation.

The present invention provides a computer tool comprising:
  working memory to receive the input data,
  auxiliary memory to store multiple approximation dictionaries,
  a reducer arranged to calculate iteratively the approximation data of input data, in which the successive iterations are of the MP type,
  a selector arranged to select an approximation dictionary in the auxiliary memory based on a selection rule as a function of at least some of the preceding iterations,
  in which the reducer calls the selector at each iteration, and uses the dictionary thus selected in the matching pursuit.

The invention further proposes a method for driving approximation dictionaries comprising the steps of:
  selecting a set of training data,
  partitioning the training data set into a selected number of training groups using an algorithm of the K-Means family,
  defining an approximation dictionary comprising an item for each training group according to a selection rule,
  projecting the training data set on the approximation dictionary in order to extract a number of new training data sets, with each new training data set comprising the data corresponding to the difference between the data of the training set and the projection of these data on the approximation dictionary,
  repeating steps b)-e) with each of the new training data sets until a stop condition related to the number of repetitions is met.

Advantageously, step b comprises the use of an algorithm of the K-Means family using a distance measurement based on the projection, and in which the centroids are chosen based on a breakdown into singular values of each group, and in which step c comprises the selection of the centroids obtained from step b as items.

BRIEF DESCRIPTION OF THE DRAWINGS

Other characteristics and advantages of the invention are better understood from a reading of the following description, based on non-limiting examples from the drawings, in which.

DETAILED DESCRIPTION

The drawings and description below essentially contain elements that are determinate in nature. Thus, they not only aid in a better understanding of this invention, but also serve to define it, if necessary.

By its nature, this description may include elements subject to copyright protection. The holder of the rights has no objection to identical reproduction by any person of this patent or its specification as it appears in the official files. In all other respects, the owner reserves all rights.

Figure 1:
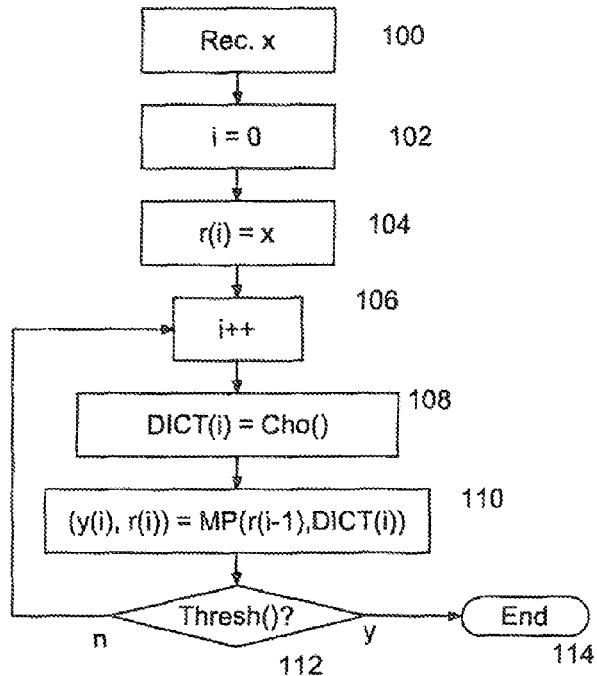
FIG. 1 shows a method for obtaining a sparse representation according to the invention.

FIG. 1 shows a calculation procedure for a sparse representation according to the invention.

This method begins with an operation 100 receiving a common element x to be approximated by means of an empty vector, known as a "parsimonious vector". The element x may be any type of computer data to be encoded. For example, this element may be a picture box within an image or a flow of images to be encoded, or a soundtrack in a musical recording, etc.

In an operation 102, an iteration counter i is initialised; in an operation 104, a residual variable r(i) receives the element x. At each iteration, the residual variable r(i) receives the remainder of the current approximation, and constitutes the approximated element in the subsequent iteration, the classic case of an MP algorithm.

The sparse representation of x is calculated by means of a loop comprising an increasing operation 106 of the iteration counter, followed by a dictionary selection operation 108 for the current iteration, an approximation vector calculation operation 110, and an operation 112 testing the condition for ending the loop.

When the loop has ended, the operation reducing element x ends, and the method terminates in an operation 114 by transmitting the calculated data and the initiation of the reduction of the following element x.

The operation 108 comprises the calling of a function Cho( ), which receives the iteration counter i as an argument, and responds by sending a dictionary optimised for this iteration, which is stored in a variable DICT(i).

In the operation 110, a function MP( ) is called with the remainder of the preceding iteration r(i−1), as well as the dictionary of the current iteration DICT(i). Thus, from iteration to iteration, the element x is approximated according to the classic formula of MP algorithms.

It will be noted that the function MP( ) can implement any type of algorithm of the MP family.

The result of the operation 110 is an approximation y(i) and a remainder r(i). The approximation y(i) comprises an identifier of the item of the dictionary DICT(i), which best approximates the remainder of the preceding iteration r(i−1), and its multiplication coefficient.

The loop termination condition of the operation 112 can be tested by a function Thresh( ). The function Thresh( ) can take into account one or more conditions selected from amongst:

a maximum number of iterations, i.e., a maximum number for i, a measurement of the residual energy in r(i), i.e., the calculation of a standard for the remainder r(i) and comparison with an intended precision threshold.

The method for seeking the parsimonious vector is of particular interest here because the function Cho( ) allows for adaption of the choice of dictionary to the current iteration.

This means that it will be possible to be more precise in a comparable number of iterations in relation to the prior art approaches. Furthermore, this also makes the method independent of the number of iterations provided for the search for the parsimonious vector: because a dictionary is specifically selected in each iteration, the total number of iterations is of little importance.

Figure 2:
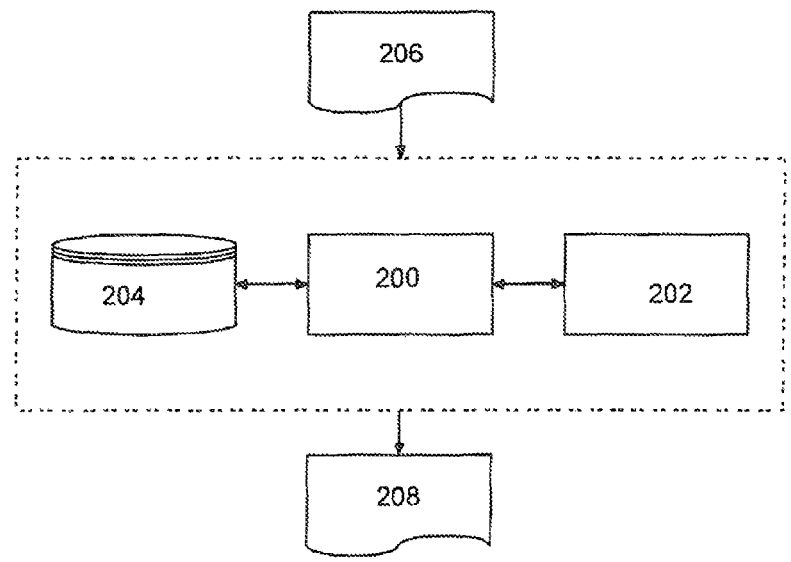
FIG. 2 shows a computer tool implementing the method of FIG. 1.

FIG. 2 shows a simplified schematic of a computer tool implementing the method of FIG. 1.

The computer tool disclosed by the invention comprises a dictionary selector 200 and a vector reducer 202, as well as a memory 204 to store the dictionaries DICT(i).

The tool receives elements x in the form of data 206, and sends sparse representation data 208.

The computer tool described here represents an element suitable for incorporation in a computer device that uses sparse representations, e.g., an encoding/decoding, denoising, prediction, or source separation device. As such, it is suited to be a "brick" in the treatment of a broader device.

Persons skilled in the art will thus recognise that the data 206 and 208 can be stored in a temporary memory of the tool, or in the memory 204, and that these memories can be those of a device into which the computer tool is integrated.

On the other hand, persons skilled in the art will also recognise that the selector 200 and the reducer 202 can be implemented separately or together, as software, i.e., in the form of code executed by a general processor of a device into which the computer tool is integrated, or "physically", i.e., by one or more dedicated processors.

As will be seen in the following, the dictionaries inside the memory 204 are not stored randomly or generated automatically by the function Cho( ). These dictionaries are intrinsically associated with the iterations of the reducer, as will be seen below.

Figure 3:
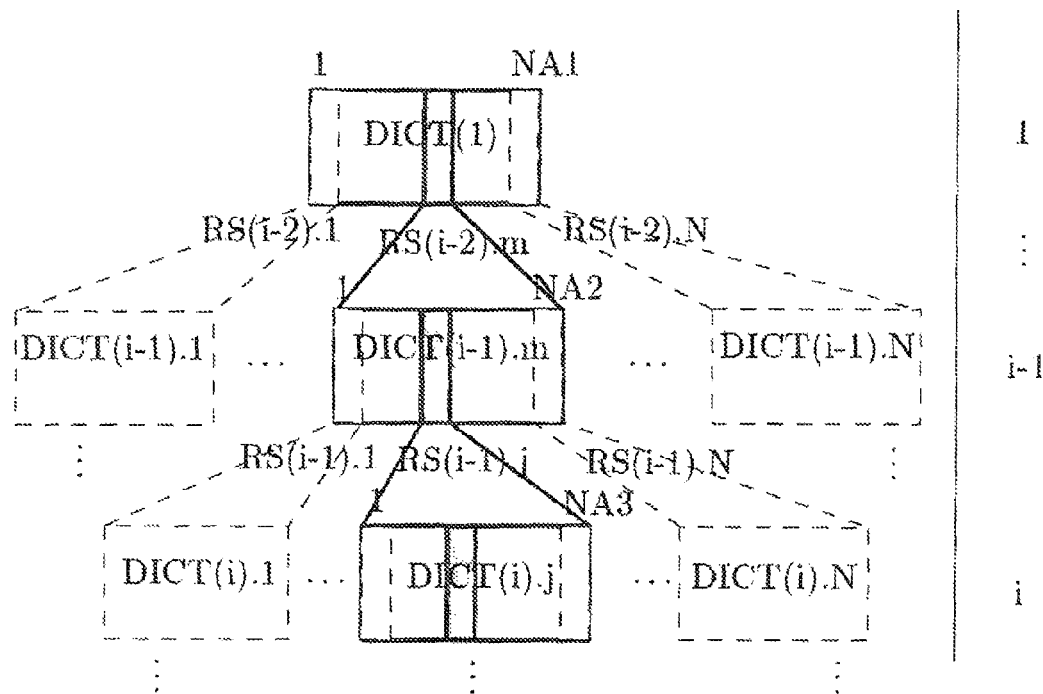
FIG. 3 shows a schematic of a dictionary tree for the method of FIG. 1.

FIG. 3 represents an example of architecture for dictionaries implementing the method of FIG. 1.

In this architecture, the dictionaries are organised according to a tree structure. In this tree structure, each level will contain all dictionaries available to the iteration, with the number corresponding to the level within the tree.

Thus, the first level of the tree comprises a single dictionary that will be used in the first iteration; the second level of the tree comprises a set of dictionaries that will be used for the second iteration, etc.

Furthermore, in the example described here, each dictionary chosen for an iteration conditions the choice of dictionary in the following iteration. In fact, as well be seen in the description of FIGS. 5-7, it is possible to drive dictionaries based on "dictionary paths" taken by the preceding iterations.

Figure 4:
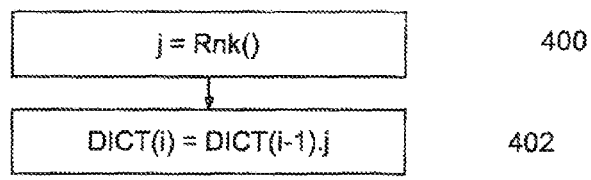
FIG. 4 shows an example of a dictionary selection function for the method of FIG. 1, adapted to the dictionary tree of FIG. 3.

FIG. 4 shows an example of the implementation of the function Cho( ), supported on the tree architecture of FIG. 3.

In an operation 400, the function Cho( ) recovers the index of the item chosen to approximate the remainder in the preceding iteration. To this end, a function Rnk( ) receives as arguments the approximation y(i−1) determined in the preceding iteration, as well as the dictionary DICT(i−1), which was used for its calculation.

Once the rank j of the vector y(i−1) in DICT(i−1) has been determined, a single dictionary is designated at the following level. The dictionary chosen DICT(i) is then defined in an operation 402 as the j-th child of the node corresponding to the dictionary DICT(i−1) in the tree.

Thus, it can now be seen how the architecture of FIG. 3 structures the choice of dictionary: each time a dictionary is chosen in a given iteration, only its children in the tree can be chosen in the following iteration.

This allows for implementation of the simple selection function Cho( ). The balance to be struck is that this requires the provision of a tree in which the dictionary paths are optimised. As will be seen below, this condition is not very restrictive, taking into account the methods developed by the applicants.

As was seen in FIG. 3, the first embodiment is based on a dictionary tree optimised based on the path taken in the preceding iterations.

This optimised dictionary tree can be created by means of a recursive function ITD( ).

The function ITD( ) is based on a principle of propagation of a set of training vectors used to optimise the dictionaries progressively. At each level, each training set generates various sets of remainders that serve to drive the lower-level dictionaries.

The function ITD( ) must first be initialised by an operation 500, in which the first dictionary and the first set of remainders are calculated.

The operation 500 is carried out by a function Creat( ), which receives as arguments a set of P training vectors y. In the example described here, the training set comprises a multitude of training vectors y, in which the number P of vectors y is much greater than the size provided for each of the dictionaries of the tree. These training vectors are chosen so as to be as varied as possible, in order to offer optimal dictionary construction.

The training vectors can be taken from a training vector database, or they can also be synthetic, i.e., created to recover an intended vector space as regularly as possible.

Figure 6:
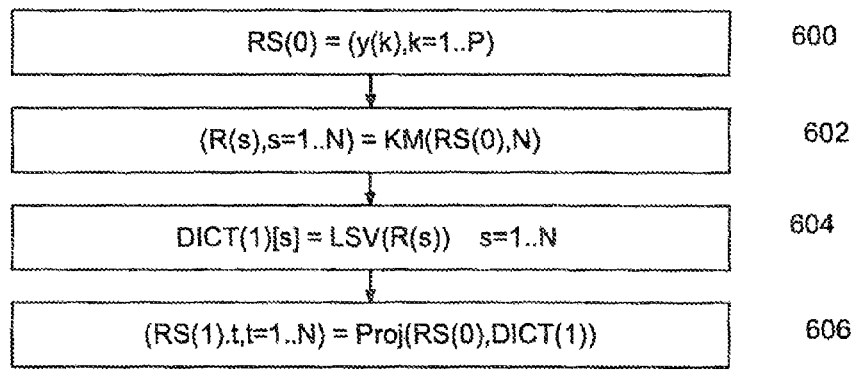
FIG. 6 shows a flowchart for an operation of FIG. 5.

An example of the implementation of the function Creat( ) is shown in FIG. 6. As can be seen in that figure, the function Creat( ) starts with an operation 600, in which the training vectors are stored within a set of remainders RS(0). In an operation 602, the tool implements a function KM( ) to partition the set of remainders RS(0) into a number N of sets of training remainders R(s). The function KM( ) is a function that implements an algorithm of the K-Means family, starting from the set of residues RS(0) and the number N as arguments.

For clarity, it will be noted that, in a K-Means algorithm, a set of vectors is partitioned iteratively in the following way:

a) the vectors are partitioned based on their distance from centroids, with the distance depending on a measurement rule, b) once the vectors are partitioned, the centroids are recalculated within each partition, according to a centroid selection/calculation rule, c) the following iteration resumes at a) based on new centroids, until a termination condition related to the number of iterations and/or the development of the centroids has been met.

Thus, it can be seen that, in an algorithm of the K-Means family, the measurement used to calculate the distance between the vectors and the centroids to carry out the partitioning for each iteration and the calculation rule for the centroids prior to each iteration are parameters that define the specific algorithm.

In the algorithm implemented in the example described here, the measurement used is the projection, and the centroid selection/calculation rule is based on a breakdown of each partition into individual values.

More precisely, the vectors of one given partition are first assembled side by side in a matrix. This matrix is then broken down into individual values in the form UΣVT, in which the individual values are ordered by descending value in the diagonal of Σ. Then, the matrix U is reduced to its first column U1 as a centroid for this partition.

The combination of the projection as a measurement and the breakdown into individual values for the centroids presents numerous advantages described below, in particular, in terms of orthogonality.

Then, in an operation 604, the dictionary DICT(1) is calculated by means of a function LSV( ). The function LSV( ) takes as its argument the N sets of training remainders R(s) calculated with operation 602, reducing them to a dictionary.

To this end, the function LSV( ) implements a selection rule based on a breakdown of each set of training residues R(s) into individual values.

This selection rule is very close to the centroid calculation rule of the function KM( ). More precisely, the vectors of a given set of training remainders R(s) are first assembled side by side in a matrix. This matrix is then broken down into individual values in the form $U\Sigma V^T$, in which the individual values are ordered by descending value in the diagonal of Σ.

The matrix U is then reduced to its first column U1, and the set of training remainders R(s) is reduced to this vector U1. Lastly, the dictionary DICT(1) is defined as the concatenation of all vectors obtained by reducing the sets of training remainders R(s).

Once the first dictionary DICT(1) has been calculated, the first set of training remainders RS(1) is calculated in an operation 606. In order to facilitate the creation of the dictionary tree, a tree is created for the sets of training residues that is included in the dictionary tree, as shown in FIG. 3. In one variant, the sets of residues can be stored in a separate tree.

This is carried out by storing the result of a function Proj( ) in each child RS(1).s of the first node, with the function Proj( ) receiving as arguments the set of training remainders RS(0) and the dictionary DICT(1).

The function Proj( ) caries out the following operations for each vector of the set of training remainders RS(0):

it determines the item of the dictionary DICT(1) closest to the vector, and it stores the remaining vector corresponding to the difference between the vector upon entry and its projection on that item in the set RS(1).t, where t is the index of the item in the dictionary DICT(1).

As a result, the nought-level node produces N child training residue sets S(1), taken from the initial training set RS(0).

Once the first dictionary DICT(1) and the first set of remainders RS(1) have been calculated, the function ITD( ) is called with these elements as arguments in an operation 502.

Figure 7:
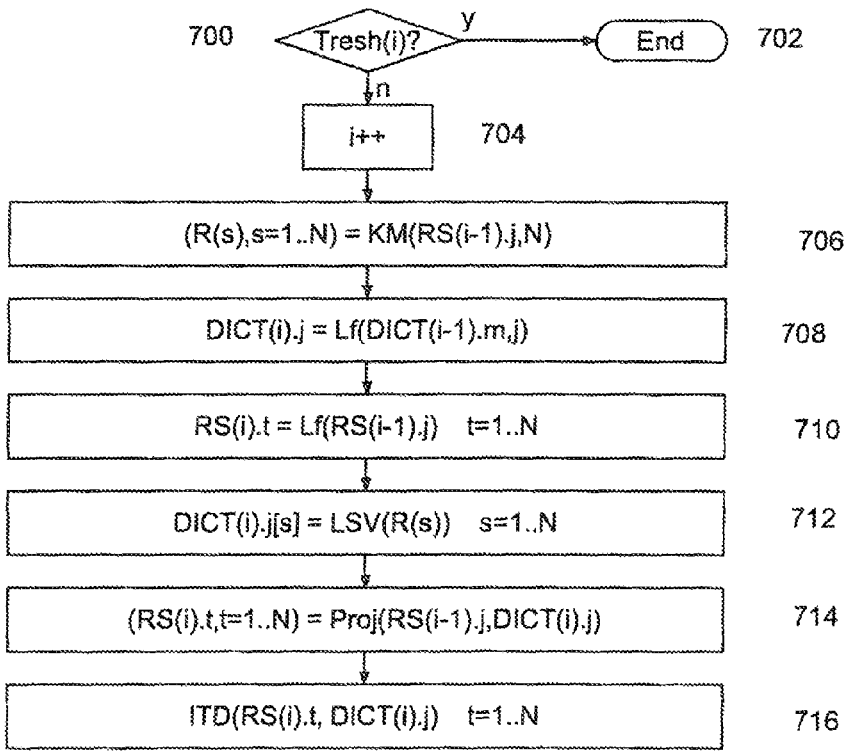
FIG. 7 shows a flowchart for another operation of FIG. 5,
  FIGS. 8 and 9 show variants of FIGS. 5 and 7, and
  FIGS. 10 and 11 show other variants of FIGS. 5 and 7.

FIG. 7 shows an example of the implementation of this function. The function ITD( ) starts by testing a termination condition in an operation 700. This termination condition is tested in the example described here by a restricted version of the function Tresh( ) described in FIG. 1.

Here, the only termination condition of the function Thresh( ) is the number of iterations. The purpose of this termination is that, from a mathematical standpoint, each iteration corresponds to one projection of the remainder on a base formed by the items of the dictionary of this iteration.

If the dictionaries are orthogonal with one another and/or the function of the family MP chosen is orthogonal, the vector is thus projected in relation to a new vector independent of this base. Thus, there can be no more iterations than dimensions in the vector one is seeking to approximate.

Thus, if d is the dimension of the initial vector, the maximum number of iterations is d. This also has the advantage of ensuring the convergence of the function ITD( ). If the dictionaries are not orthogonal with one another and/or the function of the family MP chosen is not orthogonal, the approximation is considered satisfactory after a desired number of iterations.

In both cases, it is wise to limit the number of iterations to a fraction of the value d, in order to avoid having too many dictionaries to store. As the dictionaries are optimised, this will not have an excessive effect on the quality of the approximations.

One the maximum number of iterations has been reached, the function IDT( ) terminates in an operation 702. In this function, the threshold condition for the remainders is not implemented. Advantageously, the null remainders or those that are less than a threshold are removed from the training remainder sets to which they belong over the course of the operation.

After the operation 700, the iteration counter i is increased in an operation 704. At this point, it is worth describing the context of the execution of the function ITD( ). Following the first iteration, the dictionary tree comprises a dictionary DICT (1), and the remainder tree comprises N set of training remainders taken from the dictionary DICT(1). The tree is thus easily imagined.

At any level of the dictionary tree, the matter is rather more complex. In the context of the example described here, each dictionary of a level i gives rise to N dictionaries of the level i+1, i.e., a child dictionary per item of the parent dictionary, driven on the sets of remainders of level i corresponding to this item.

In the general case (taking into account that the counter i has just been increased in 704), the function ITD( ) thus first receives a set of training remainders RS(i−1).j, corresponding to the j-th item of a dictionary DICT(i−1).m.

In an operation 706, the set of training remainders of the iteration i−1 is partitioned, as was done in operation 602. Once this has been done, N sets of training residues R(s) are obtained.

Then, in an operation 708, the dictionary DICT(i).j, which will result from these N sets of training remainders is initialised as a child of the dictionary DICT(i−1).m. This dictionary is initialised at the j-th rank, as it arises from the item j of the dictionary DICT(i−1).m. The N sets of training remainders RS(i).t are then initialised in an operation 710 as a child of the set of remainders RS(i−1).j.

The dictionary DICT(i).j is then filled in an operation 712 with the function LSV( ) called with the N sets of training remainders R(s) arising from the operation 706, similarly to what was done in the operation 604.

Once the dictionary DICT(i).j has been filled, the set of remainders RS(i−1).j is exploded into the N sets of remainders RS(i).t with t varying between 1 and N, by means of the function Proj( ) in an operation 714.

Lastly, the function ITD( ) is relaunched N times in an operation 716, having as a pair of arguments the dictionary DICT(i).j on the one hand, and each of the N sets RS(i).t on the other.

It appears important to note that, in the foregoing, the indices given are not absolute, but relative. Thus, as mentioned above, the initial dictionary is the dictionary DICT(i−1).m, any dictionary from amongst all dictionaries of level i−1.

The notation DICT(i−1).m indicates the point of entry into the dictionary tree; it is a pointer, and its content in itself does not matter. Corresponding to this dictionary DICT(i−1).m is a set of training remainders arising from a previous iteration RS(i−2).j. This dictionary DICT(i−1).m produces N sets of remainders RS(i−1).t, with t=1 to N. The example described here concerns only one of these sets (the set RS(i−1).j), but, as shown by the operation 716, the function ITD( ) is called N times with each set of training remainders RS(i).t produced over the course of the current execution of the function ITD( ).

The result of all these iterations is that the dictionary tree is created recursively, with each dictionary of one level creating N dictionaries in the next. Furthermore, these dictionaries are interconnected within the dictionary tree by design, with their convergence being ensured by the termination condition connected to the iterations.

Figure 5:
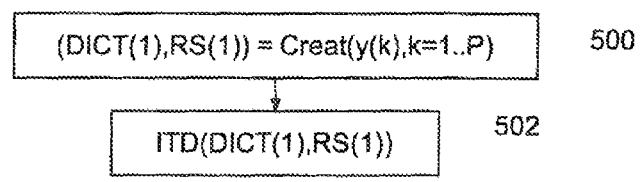
FIG. 5 shows a generation function for the dictionaries of FIG. 3.
Figure 8:
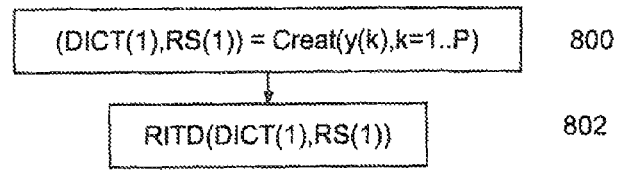
Figure 9:
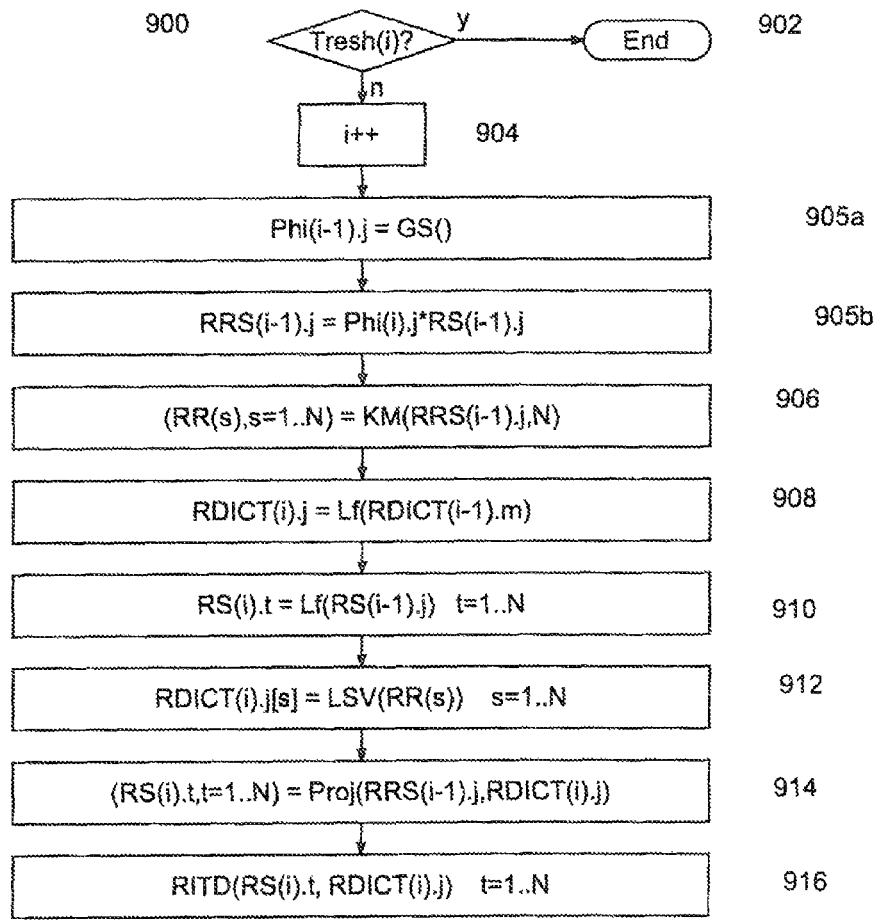

FIGS. 8 and 9 show variants of FIGS. 5 and 7, with the initialisation function Creat( ) remaining the same.

These figures are based on the finding that the method of generating dictionaries allows for a reduction of their size. In fact, as noted above, each set of training remainders is the result of a projection on an item of a dictionary. Accordingly, the dictionaries created at the next level in the tree on the basis of these sets of training remainders are orthogonal with the item on which the projection was based. The components (the line) corresponding to this item can thus be removed from the training remainders as their contribution is nil.

Thus, the operation 800 is identical to the operation 500, and the operation 802 differs from the operation 502 in that it is a new function RITD( ) that is called.

Generally, operations similar to those of FIG. 7 are renumbered, replacing the number of "7" in the hundreds with the number "9". With regard to the differences between the functions ITD( ) of FIG. 7 and RITD( ) of FIG. 9:

a new operation 905a, establishing a matrix Phi(i−1).j to remove the components corresponding to the item j of the previous iteration, by means of a function GS( ), a new operation 905b, using the matrix Phi(i−1).j to reduce the set of training remainders RS (i−1).j, a prefix "R" is added to the reduced elements to indicate reduction, with the exception of the final remainder that continues to be known as RS(i).t.

The function GS( ) is an orthogonalisation function that takes as its initial vector the item chosen in the previous iteration, taking from it an orthogonal vector base and complementing the item. This can be done, e.g., by means of a Gram-Schmidt algorithm. These vectors form the columns of the matrix Phi(i−1).j.

This method allows for saving space, as each dictionary is reduced in size by one line in each iteration. This also allows for saving calculation power, as the size of the matrices and the dictionaries decreases at each iteration.

The dictionary driving methods described above are conditioned on two principal elements.

First, these methods create the dictionaries in "cascade" fashion, i.e., each dictionary of one given iteration generates N dictionaries in the following iteration.

This is obtained by executing the initial partitioning into N sets of training remainders in each execution. In one variant, the number of sets of remainders could vary in each iteration, as suggested by FIG. 3 (NA1 for the first iteration, NA2 for the second, etc.), depending on the parameter N passed to operations 706 and 906.

Furthermore, the method for selecting/calculating centroids in the partitioning method is, in the example described, based in each iteration on the selection of the strongest item in the breakdown into individual values in each partition. This rule can be replaced by a barycentric selection/calculation, for example.

Additionally, the calculation method for the items to form the dictionaries is also crucial, and is based on operations 712 and 912 on the selection of the strongest item in the breakdown into individual values of each partitioning set of sets of training remainders. Another rule could be used, e.g., a barycentric rule.

It is this same selection rule that is used in the function Cho( ) to choose the dictionary for the current iteration in the function of FIG. 4. In fact, in the example described here, it is the item arising from the function MPE( ) of the preceding iteration that is used to designate the dictionary of the current iteration, which results in choosing the item with the greatest correlation in the breakdown into individual values.

In one variant, another selection rule could be used to choose the dictionary of an iteration. For example, such a rule could select the dictionary designated by the item of the dictionary DICT(i−1) of the preceding iteration best approximating the remaining vector sought to be approximated, taking into account vectors corresponding to the strongest K individual values, and not only the first.

Figure 10:
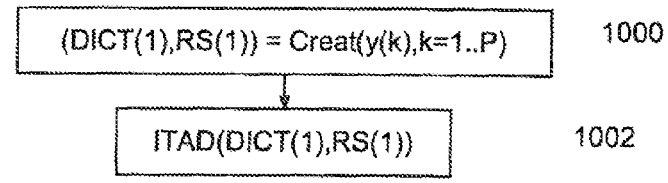
Figure 11:
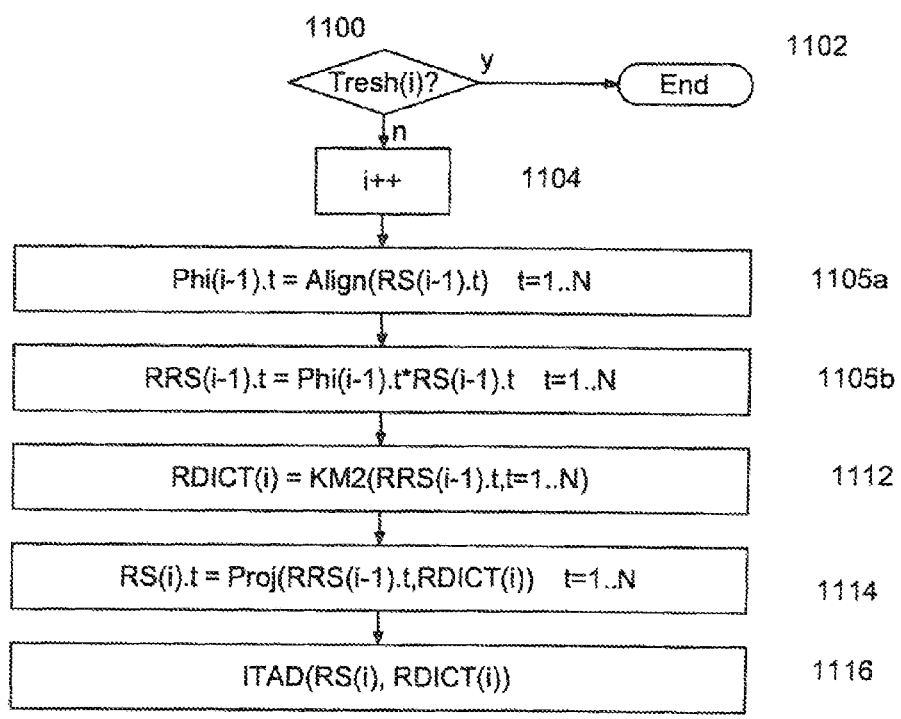

FIGS. 10 and 11 show other variants of FIGS. 5 and 7, in which the function Creat( ) remains identical.

These variants are based on the same principle as the variant of FIGS. 8 and 9, but intend a lighter implementation with only one dictionary stored per iteration level. it is reduction matrices Phi(i−1).t that ensure the adaptation to each item selected, yielding N dictionaries based on the dictionary stored at each level.

Based on the fact that each dictionary generates only one dictionary in the following iteration, this embodiment appears simpler, and the tree structure is reduced, reducing the index notations and eliminating certain operations. However, contrary to the case of FIGS. 8 and 9, the functions Phi(i−1).t can no longer be implicit, and must be stored here with the dictionary RDICT(i).

For FIG. 10, the only difference to FIG. 8 is that it is the function ITAD( ) that is called, and no longer the function RITD( ).

Generally, the operations similar to those in FIG. 9 are renumbered, replacing the hundreds figure "9" with the number "11". With regard o the differences between the functions ITAD( ) of FIG. 11 and RITD( ) of FIG. 9, it is noted that:

the operation 1105a is different to the operation 905a in that the matrices Phi(i).t are constructed by a function Align( ) described in detail below, the partitioning operation 906 to generate N sets of training remainders and N resultant dictionaries is eliminated, the operations related to the management of trees 908 and 910 are eliminated, the dictionary generation operation 912 is carried out by a function KM2( ), which is described in detail below, and no longer by the function LSV( ), the operation 1116 only calls a single recursion of the function ITAD( ), but with a set of remainders comprising the N sets of remainders just created (taken into account by the operation 1105a).

The function Align( ) carries out a breakdown into individual values of each set RS(i−1).t in the form $U\Sigma V^T$, in which the individual values are ordered in descending value in the diagonal of $\Sigma$.

Then, the matrix U is reduced to its columns corresponding to the individual non-null values of $\Sigma$. Thu, the matrix Phi(i−1).t forms an orthogonal base of RS(i−1).t.

The function KM2( ) is very close to the function KM( ) to the extent that it executes the same calculations. However, it differs due to its input and its output. Here, all reduced sets RRS(i−1).t are regrouped to form the input, and the output is the dictionary RDICT(i).

The function KM2( ) uses as a centroid selection/calculation rule the selection of the vector corresponding to the strongest individual value. It is these centroids that are used to fill the dictionary RDICT(i) in an operation 1112.

Furthermore, as this design is orthogonal, the operations 1105a and 1105b "align" the remainders, in the sense that all sets of reduced remainders RRS(i−1).j will have the same matrix U in their breakdown into individual values. This allows for the use of a single dictionary RDICT(i), with the matrices Phi(i−1).t allowing for the adaptation of this dictionary RDICT(i) to each set RRS(i−1).j.

Lastly, in the operation 1116, reference is made to RS(i), in the sense that it is the combination of the N sets RS(i).t calculated in operation 1114.

It is this alignment that allows for only preserving one dictionary per iteration i, whilst benefiting from the advantages of the variant of FIGS. 8 and 9. This comes at the price of storing the matrices Phi(i).t, which allow for this alignment.

In the foregoing, provision was made for varying the dictionary in each iteration. However, the function Cho( ) could choose one dictionary per group of a selected number of iterations, or it could only be called every K iterations.

Furthermore, a schematic was shown in which the function MP( ) is the same for all iterations. However, this function has a relatively low cost, and the execution of several distinct functions MP( ) implementing a different version of the matching pursuit family, only saving the best each time, could be envisaged.

Furthermore, the fact of choosing and driving the dictionaries by breakdown into individual values generates orthogonal elements, which reduces the attraction of using functions of the types OMP or OOMP. However, if the selection rule for the dictionaries were different, the techniques would lose all of their interest.

The invention claimed is:

1. A computer tool comprising:
    a working memory to receive input data,
    an auxiliary memory to store several approximation dictionaries,
    a reducer arranged to calculate iteratively approximation data on the input data, in which the successive iterations are of the matching pursuit type,
    a selector arranged to select an approximation dictionary from the several approximation dictionaries in the auxiliary memory as a function of a selection rule based on at least some of the preceding iterations,
    in which the reducer calls the selector in each iteration, and uses the dictionary thus selected in the matching pursuit, wherein, for a given iteration, and in the presence of the approximation dictionary selected by the selector, the reducer:
    determines an item from the approximation dictionary corresponding to the current input data of the given iteration;
    defines a corresponding item identifier and a proportionality coefficient amongst the current input data and the item as approximation data;
    calculates a remainder corresponding to the difference between the input data and the item, multiplied by its proportionality coefficient, and
    calls the following iteration with the item identifier for the selector, and the residue, as new current input data.

2. The computer tool as recited in claim 1 wherein the selection rule comprises the selection of the approximation dictionary as a function of the number of the current iteration and/or the approximation data calculated in the preceding iterations.

3. The computer tool as recited in claim 2 wherein the approximation dictionaries are interconnected by a tree structure, and the selection rule comprises the selection of the approximation dictionary at a level of the tree taken from the number of the current iteration.

4. The computer tool as recited in claim 3 wherein each approximation dictionary of a given level is associated with a selected number of child approximation dictionaries at the following level of the tree, and the selection rule comprises the selection of the approximation dictionary from amongst the children of the approximation dictionary selected in the preceding iteration.

5. The computer tool as recited in claim 4 wherein each item of each approximation dictionary of one given level is associated with a child dictionary in the following level of the tree, and the selection rule for a given iteration comprises the selection of the child dictionary corresponding to the item designated by the item identifier of the approximation data calculated in the preceding iteration.

6. The computer tool as recited in claim 3 wherein each approximation dictionary of one given level in a tree comprises items whose size is smaller of one than the items of the higher-level dictionaries.

7. The computer tool as recited in claim 6 wherein the reducer calculates in each iteration a set of reduction data, and the reducer uses the set of reduction data for the calculation of the successive approximation data.

8. The computer tool as recited in claim 6 wherein the tree comprises a single dictionary per level, in which the auxiliary memory additionally stores sets of reduction data, with each dictionary item of a given level in the tree being associated with one of the sets of reduction data.

9. The computer tool as recited in claim 8 wherein the reducer uses a set of reduction data to calculate the successive approximation data.

\* \* \* \* \*